Figure 1:
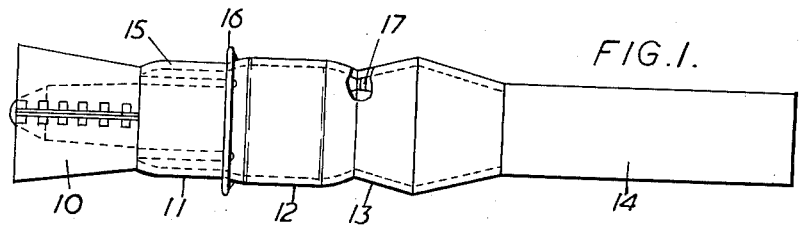

July 24, 1962 T. BOWMER 3,045,965
TURBINE BLADES, VANES AND THE LIKE
Filed Feb. 19, 1960 3 Sheets-Sheet 1

Inventor
THOMAS BOWMER

By Cushman, Darby & Cushman
Attorneys

Inventor
THOMAS BOWMER
By Cushman, Darby & Cushman
Attorneys

Inventor
THOMAS BOWMER

United States Patent Office 3,045,965
Patented July 24, 1962

3,045,965
TURBINE BLADES, VANES AND THE LIKE
Thomas Bowmer, Wollaton, Nottingham, England, assignor to Rolls-Royce Limited, Derby, England, a company of Great Britain
Filed Feb. 19, 1960, Ser. No. 9,887
Claims priority, application Great Britain Apr. 27, 1959
9 Claims. (Cl. 253—39.1)

This invention concerns the cooling of blades (e.g. turbine rotor or turbine stator blades) employed in fluid flow machines such, for example, as gas turbine engines.

The term "blade" is used in this specification in a wide sense to include blade-like members such as nozzle guide vanes.

According to the present invention there is provided a blade adapted for use in a fluid flow machine and having a duct therein which is adapted to be supplied with cooling fluid, the blade having a plurality of slots therein through each of which a stream of cooling fluid may pass from the said duct so as to be directed over the external surface of the blade, the slots being so arranged that the said streams intermingle over the said external surface.

The slots are preferably disposed in the trailing portion of the blade and are preferably so arranged thats ubstantially the whole external surface of the trailing portion is cooled by said streams.

Means are preferably provided for directing at least part of, and preferably all of the cooling fluid which is supplied to said duct onto an internal surface of the blade adjacent the leading edge thereof.

Thus the said duct may be provided with means for directing a jet of cooling fluid onto the said internal surface adjacent the centre of the leading edge thereof.

The duct may comprise a tube which is mounted within and extends radially of the blade and which has a cooling fluid inlet portion which is open to the exterior of the blade, the tube having an aperture therein through which cooling fluid may pass in the form of a jet onto the said internal surface of the blade adjacent the centre of the leading edge thereof.

Alternatively the duct may comprise a plurality of intercommunicating passages through said blade, each of said passages extending from the root to the tip of the blade. Preferably one of said passages extends adjacent the trailing edge of the blade and another of said passages extends adjacent the leading edge of the blade.

In addition to the slots in the trailing edge, there may be further slots in the leading portion of the blade, said further slots communicating with said duct so that some of the cooling fluid supplied to said duct escapes through the said further slots.

The invention also comprises a gas turbine engine provided with blades as set forth above.

Preferably the slots in the blades are arranged at an angle to the longitudinal axis of the turbine of the engine.

The outer portion of each slot is preferably so formed as to have a major axis which converges in a downstream direction towards th axis of the turbine of the engine, and major axis of each slot in the inner portion of the blade preferably diverges away from the axis of the turbine of the engine.

Figure 2:
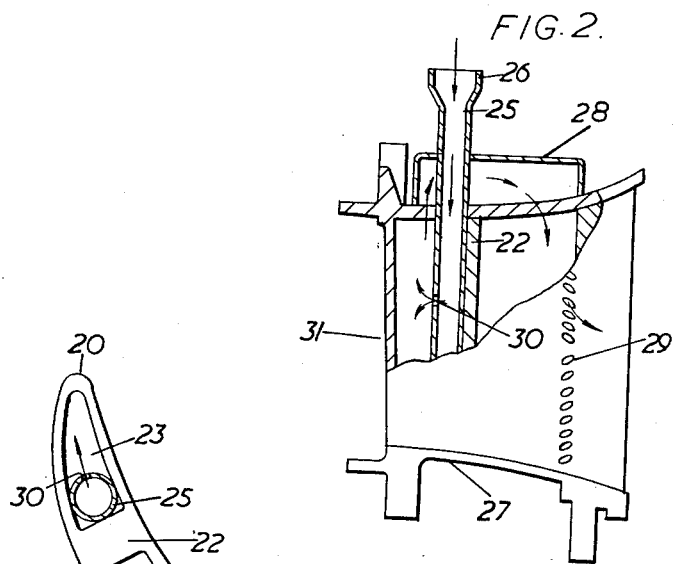
Figure 3:
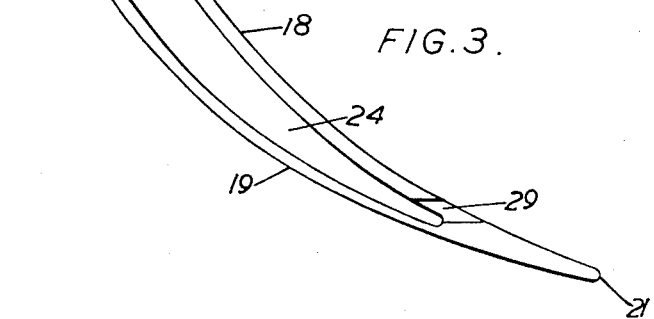
Figure 7:
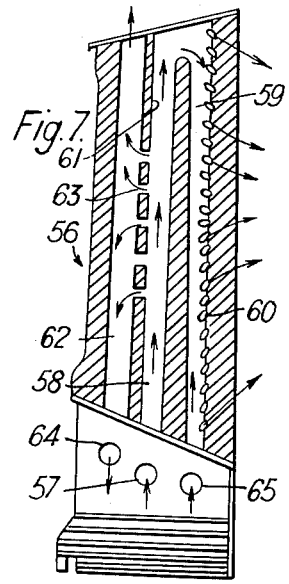
Figure 8:
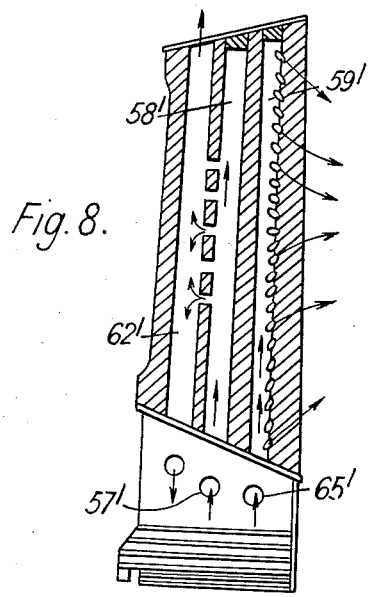
Figure 9:
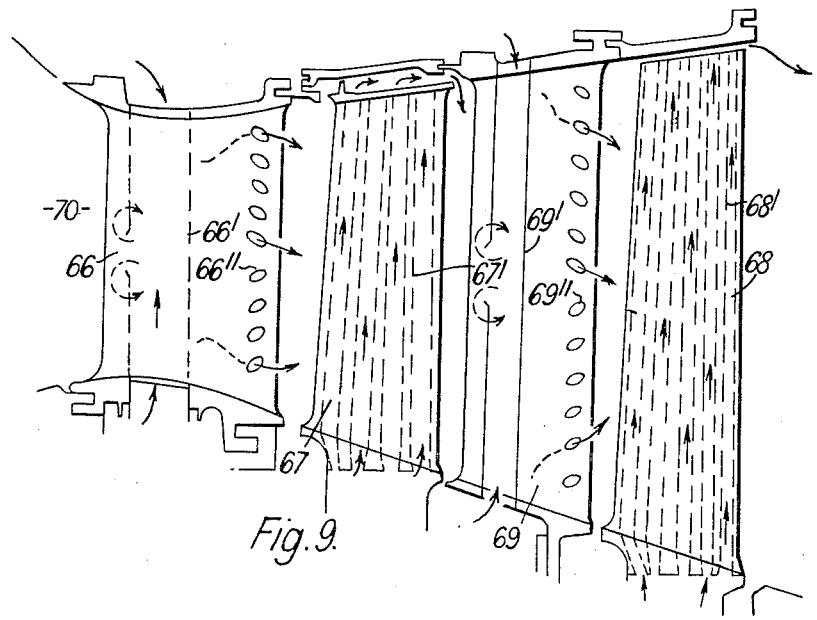

The invention is illustrated, merely by way of example, in the accompanying drawings. In said drawings:

FIGURE 1 is a side elevation of a gas turbine engine of the compound by-pass type provided with inlet guide vanes embodying the present invention, FIGURE 2 is a side elevation partly in section showing one form which can be taken by a turbine inlet guide vane of the engine of FIGURE 1, FIGURE 3 is an enlarged cross section through the inlt guide vane of FIGURE 2, FIGURES 4–8 are side elevations, partly in section of a number of different turbine rotor blades embodying the present invention all of said turbine rotor blades being adapted for use in the engine of FIGURE 1, and FIGURE 9 is a section through part of a turbine, e.g. of the engine of FIGURE 1.

Referring first to FIGURE 1, a gas turbine engine for use in an aircraft comprises a low pressure compressor 10, a high pressure compressor 11, combustion equipment 12, turbine 13, and jet pipe 14. The gas turbine engine of FIGURE 1 is of the compound by-pass type having a by-pass passage 15 whose inlet end is disposed between the low and high pressure compressors. A fuel manifold 16 supplies fuel to the combustion equipment 12.

The combustion gases supplied to the turbine 13 from the combustion equipment 12 are directed on to the turbine blades (not shown) by way of inlet guide vanes, e.g. the inlet guide vanes 17 which are shown in detail in FIGURES 2 and 3.

Each of the inlet guide vanes 17 is hollow and comprises an outer wall made up of curved wall portions 18, 19. The wall portions 18, 19 are spaced from each other except at the leading and trailing edges 20, 21 respectively of the vane 17. The wall portions 18, 19 are interconnected by a web 22, which divides the vane into compartments 23, 24.

Mounted within the compartment 23 adjacent the web 22 is a tube 25 which extends radially of the vane 17. The tube 25 has a funnel-shaped air inlet portion 26 which is disposed externally of the vane. Means, not shown, are provided for directing cooling air into the air inlet portion 26, the cooling air being derived from the engine compressors.

Each vane 17 has a root portion 27 and has a shroud 28 disposed on the side of the vane opposite the root portion.

The wall portion 18 has a plurality of slots 29 therein most or all of which are arranged at an angle to the axis of the engine. Thus cooling air may pass from the compartment 24 and through the slots 29 in the form of a plurality of air streams which intermingle with each other over the trailing portion of the vane.

Thus film cooling of substantially the whole of this trailing portion is effected.

The tube 25 is provided with an aperture 30 which is formed to direct a jet of cooling air onto the internal surface of the vane 17 at a point 31 where the peak temperature occurs. This may be, as illustrated, adjacent the centre of the leading edge 20. The arrangement is such that all the cooling air supplied to the tube 25 is initially directed onto the point 31, the cooling air flowing therefrom and via the shroud 28 to the compartment 24 and hence via the slots 29 to the trailing portion of the blade exterior.

It will be appreciated that as a result of the disposition of the slots 29, hot spots or streaks will not occur between adjacent slots 29. It will also be appreciated that as a result of directing the whole of the cooling air onto the point 31 at which peak temperature occurs, this point will be effectively cooled.

In FIGS. 4–8 are shown a number of different turbine rotor blades embodying the present invention which may be used on the engine of FIG. 1.

Figure 4:
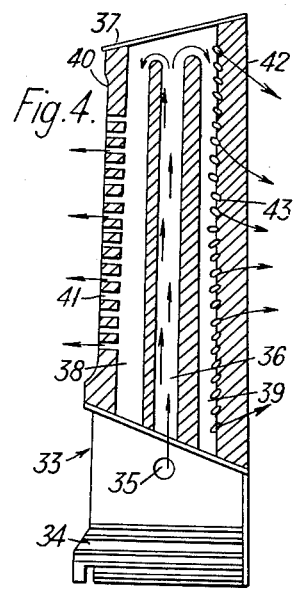

The turbine rotor blade 33 of FIG. 4 has a "fir-tree" root 34 having a hole 35 therein through which cooling air may flow into a central passage 36. The latter extends from the root 34 of the tip 37 of the blade. The tip 37 is provided with a closed end which deflects the air which has passed through the passage 36 into passages 38, 39. The passage 38 extends adjacent the leading edge 40. Apertures 41 permit the air in the passage 38 to escape out at, so as to cool, the leading edge 40. The passage 39 extends adjacent the trailing edge 42 of the blade and slots 43, corresponding to the slots 29, permit cooling air from the passage 39 to flow over the trailing edge 42 in the form of a plurality of air streams which mingle with each other.

Figure 5:
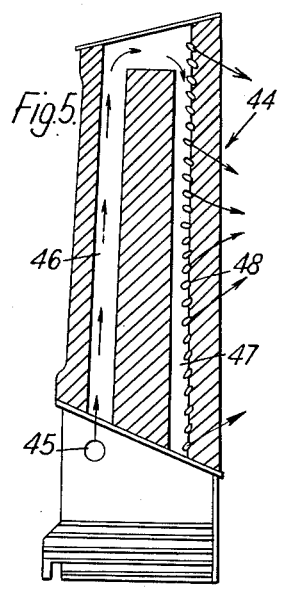

In the turbine rotor blade 44 of FIG. 5, a hole 45 is provided in the root of the blade for the flow of cooling air therethrough into a passage 46. The passage 46 extends adjacent the leading edge of the blade and communicates at the tip of the blade with a passage 47 which extends adjacent the trailing edge of the blade and which is provided with slots 48 corresponding to the slots 43 of FIG. 4. Thus in the FIG. 5 construction, all the cooling air passes initially up the leading edge of the blade, thereby giving maximum cooling in this region. Moreover, as in the other turbine rotor blade constructions shown therein, the ejection of the cooling air through the slots 48 not only effects cooling of the trailing edge but also eliminates the need for complicated methods of air ejection at either the root or the tip of the blade. As a result, in a practical embodiment of the FIGURE 5 construction, it has been found possible to obtain not only excellent cooling of the leading and trailing edges but also substantially equal cooling of both areas.

Figure 6:
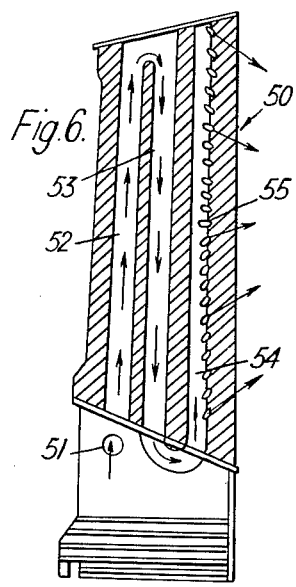

The turbine rotor blade 50 of FIGURE 6 has a hole 51 in its root through which cooling air may flow into a passage 52 and thence via a passage 53 to a passage 54. Each of the passages 52-54 extend between the root and the tip of the blade, the passages 52, 54 extending respectively adjacent the leading and trailing edges of the blade. The passage 54 is provided with slots 55 corresponding to slots 43, 48.

The turbine rotor blade 56 of FIGURE 7 has a hole 57 in its root through which cooling air may flow to a central passage 58. The latter extends to the tip of the blade where it communicates with a passage 59 which is disposed adjacent the trailing edge of the blade and is provided with slots 60 corresponding to the slots 43, 48, 55. The passage 58 has a common wall 61 with a passage 62, the latter extending adjacent the leading edge of the blade from the root to the tip thereof. Slots 63 are formed in the wall 61, the slots forming, in effect, nozzles through which cooling air from the passage 58 is directed in the form of jets onto the surface of the passage 62 adjacent the leading edge. Air may escape from the passage 62 at the tip of the blade and through a hole 64 in the root of the blade. The root of the blade is also provided with a hole 65 through which flows a part of the cooling air supplied to the passage 59.

The arrangement shown in FIGURE 8 is generally similar to that of FIGURE 7 except that the passages 58', 59' do not intercommunicate. Cooling air introduced into the passage 58' via the hole 57' is therefore supplied only to the passage 62' so as to effect cooling of the leading edge of the blade. The supply of air for cooling the trailing edge of the blade reaches the passage 59' solely via the hole 65'.

The turbine shown in FIGURE 9, which may form part of the engine shown in FIGURE 1, comprises nozzle guide vanes 66, turbine rotor blades 67, 68 and stator vanes 69. Each of the vanes 66, 69 is provided with a central passage 66', 69' respectively, opposite ends of which are supplied with cooling air. The cooling air passes out of the vanes 66, 69 and into the main annular fluid duct 70 of the engine by way of slots 66", 69" respectively which, like the slots 29, cause the air streams passing therethrough to intermingle with each other over the trailing portions of the vanes.

The turbine rotor blades 67, 68 have passages 67', 68' therein for the flow therethrough of cooling air. The passages 67', 68' are shown as being supplied with air at the root of the blades, the air escaping at the tips of the blades. Obviously, however, the blades 67, 68 could, if desired, be formed with slots corresponding to the slots 66", 69" so as to increase the cooling of the trailing edges of the blades.

I claim:
1. A blade adapted to be mounted radially relative to the longitudinal axis of a fluid flow machine, said blade having an internal chamber adapted to be supplied with cooling fluid, and a plurality of slots extending from one external surface of the blade adjacent the trailing edge thereof to said chamber, said slots having axes inclined to a mid-chord line of the blade and to a radius of the blade and emerging in said external surface in the form of elongated orifices each having a major axis extending obliquely relative to the direction of fluid flow across said external surface, the elongated orifices permitting bands of cooling fluid to escape over said trailing edge which bands intermingle at the edges thereof so that substantially the entire radial extent of said trailing edge is covered by the cooling fluid.

2. A blade as claimed in claim 1 in which said internal chamber comprises at least two passages which extend in the direction of the radial extent of the blade and which intercommunicate at their ends, said slots communicating with one of said passages which extends adjacent the trailing edge of the blade.

3. A blade adapted to be mounted radially relative to the longitudinal axis of a fluid flow machine, said blade having an internal chamber adapted to be supplied with cooling fluid, and a plurality of slots extending from one external surface of the blade adjacent the trailing edge thereof to said chamber, said slots having axes inclined to a mid-chord line of the blade and to a radius of the blade and emerging in said external surface in the form of elongated orifices each having a major axis extending obliquely relative to the direction of fluid flow across said external surface, the major axes of the elongate orifices to one side of a central portion of a radial extent of the blade converging with respect to the major axes of the elongate orifices to the other side of said central portion, the elongate orifices permitting bands of cooling fluid to escape over said trailing edge which bands intermingle at the edges so that substantially the entire radial extent of said trailing edge is covered by the cooling fluid.

4. A blade as claimed in claim 3 in which the major axes of the elongate orifices on each respective side of said central portion of the radial extent of the blade are parallel.

5. A blade as claimed in claim 3 including a plurality of slots in the leading portion of the blade, said last-mentioned slots communicating with said chamber so that a portion of the cooling fluid supplied to said chamber escapes through said last-mentioned slots.

6. A blade adapted to be mounted radially relative to the longitudinal axis of a fluid flow machine, said blade having an internal chamber, duct means in said blade communicating with said chamber for supplying a cooling fluid thereto, said duct means having at least one aperture in the wall thereof through which a flow of cooling fluid is directed onto an internal surface of the blade adjacent the leading edge thereof, the blade further having a plurality of slots extending from one external surface of the blade adjacent the trailing edge thereof to said chamber, said slots having axes inclined to a mid-chord line of the blade and to a radius of the blade and emerging in said external surface in the form of elongated orifices each having a major axis extending obliquely relative to the direction of fluid flow across said external surface, the elongated orifices permitting bands of cooling fluid to escape over said trailing edge which bands intermingle at the edges thereof so that substantially the entire radial extent of said trailing edge is covered by the cooling fluid.

7. A blade as claimed in claim 6 in which said duct means is adapted to direct said flow of cooling fluid through said at least one aperture onto said internal surface adjacent the center of the leading edge of the blade.

8. A blade as claimed in claim 6 in which substantially all the cooling fluid supplied to said duct means is initially directed on to said internal surface.

9. A blade as claimed in claim 6 in which said duct means comprises a tube mounted within said chamber and extending radially of the blade and having a cooling fluid inlet which is open to the exterior of the blade.

References Cited in the file of this patent

UNITED STATES PATENTS

| 2,489,683 | Stalker | Nov. 29, 1949 |
| 2,780,435 | Jackson | Feb. 5, 1957 |
| 2,807,437 | Roush | Sept. 24, 1957 |
| 2,828,106 | Schramm | Mar. 25, 1958 |

FOREIGN PATENTS

| 679,931 | Great Britain | Sept. 24, 1952 |
| 744,499 | Great Britain | May 8, 1957 |
| 811,586 | Great Britain | Apr. 8, 1959 |
| 845,227 | Great Britain | Aug. 17, 1960 |